(12) United States Patent
Sterbling et al.

(10) Patent No.: US 12,474,973 B2
(45) Date of Patent: Nov. 18, 2025

(54) DYNAMICALLY MIGRATING SERVICES BASED ON SIMILARITY

(71) Applicant: SAP SE, Walldorf (DE)

(72) Inventors: Sven Sterbling, Boblingen (DE);
Joachim Goennheimer, Walldorf (DE)

(73) Assignee: SAP SE, Walldorf (DE)

( * ) Notice: Subject to any disclaimer, the term of this patent is extended or adjusted under 35 U.S.C. 154(b) by 574 days.

(21) Appl. No.: 17/942,765

(22) Filed: Sep. 12, 2022

(65) Prior Publication Data

US 2024/0086259 A1 Mar. 14, 2024

(51) Int. Cl.
*G06F 9/46* (2006.01)
*G06F 9/50* (2006.01)

(52) U.S. Cl.
CPC .......... *G06F 9/5088* (2013.01); *G06F 9/5077* (2013.01); *G06F 2209/501* (2013.01); *G06F 2209/5022* (2013.01)

(58) Field of Classification Search
CPC ................... G06F 2209/501; G06F 2209/5022
See application file for complete search history.

(56) References Cited

U.S. PATENT DOCUMENTS

2021/0182117 A1 6/2021 Chen et al.

FOREIGN PATENT DOCUMENTS

| CN | 114090850 A | 2/2022 | |
|---|---|---|---|
| EP | 3992812 A1 * | 5/2022 | ........... G06F 16/334 |
| JP | 2019057236 A | 4/2019 | |

OTHER PUBLICATIONS

Myint, Edit distance computation with minimum number of edit operations in database management system and informaiton retrieval, International Journal of Scientific and Research Pulbications, vol. 9, Issue 9, Sep. 2019, pp. 651-656.*
"European Application Serial No. 23189348.8, Extended European Search Report mailed Nov. 8, 2023", 10 pgs.

* cited by examiner

*Primary Examiner* — Diem K Cao
(74) *Attorney, Agent, or Firm* — SCHWEGMAN LUNDBERG & WOESSNER, P.A.

(57) ABSTRACT

Techniques for dynamically migrating services based on similarity are disclosed. In some embodiments, a computer system may, for each online service in a plurality of online services of a source cloud environment, compute a corresponding edit distance value based on a stream of transaction log data of the online service. The edit distance value may comprise a minimum number of edit operations required to change a first log entry in the stream of transaction log data to a second log entry in the stream of transaction log data. Next, the computer system may determine a migration plan based on a measure of similarity between the edit distance values of the online services, where the migration plan specifies a distribution of the online services amongst a plurality of destination cloud environments, and then migrate the online services from the source cloud environment to the destination cloud environments using the migration plan.

20 Claims, 6 Drawing Sheets

DYNAMICALLY MIGRATING SERVICES BASED ON SIMILARITY

BACKGROUND

Cloud providers, such as platform-as-a-service providers, handle and operate a large estate of multi-tenant services, such as applications. These services are often hosted in large multi-zone datacenters that all have certain hardware constraints for vertical scalability of computing resources. Normally, in these cloud environments, different services from different customers share these computing resources in such a way that thousands of services utilize the same computing resource (e.g., thousands of applications running on the same physical server, virtual machine, worker node, etc.).

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Example methods and systems dynamically migrating services based on similarity are disclosed. In the following description, for purposes of explanation, numerous specific details are set forth in order to provide a thorough understanding of example embodiments. It will be evident, however, to one skilled in the art that the present embodiments can be practiced without these specific details.

In a cloud environment, online services can often exceed the limits of one or more computing resources of the cloud environment. As a result, the functioning of the online services and the computing resources of the cloud environment may suffer due to overloading. The features disclosed herein involve migrating online services from a source cloud environment to one or more destination cloud environments to avoid overstressing the computing resources of the source cloud environment. However, several technical issues arise in migrating online services. For example, migrating the wrong combination of online services to the same destination cloud environment may result in overloading of the destination cloud environment. Additionally, when migrating an online service to from a source cloud environment to a destination cloud environment, an error or some other problem may occur that causes the online service not to function properly in the destination cloud environment. Furthermore, the migration of online services from a source cloud environment to destination cloud environments may be improperly delayed, as the decision to migrate the online services may be made too late to avoid negatively affecting the functioning of the online services or the source cloud environment. In addition to the issues discussed above, other technical problems may arise as well.

The implementation of the features disclosed herein involves a non-generic, unconventional, and non-routine operation or combination of operations. By applying one or more of the solutions disclosed herein, some technical effects of the system and method of the present disclosure are to dynamically migrate services based on similarity. In some example embodiments, a computer system may, for each online service in a plurality of online services of a source cloud environment, compute a corresponding edit distance value based on a stream of first transaction log data of the online service. The stream of first transaction log data may comprise a first set of actions executed by the online service within the source cloud environment, and the edit distance value may comprise a minimum number of edit operations required to change a first log entry in the stream of first transaction log data to a second log entry in the stream of first transaction log data. Next, the computer system may determine a migration plan based on a measure of similarity between the edit distance values of the plurality of online services. The migration plan may specify a distribution of the plurality of online services amongst a plurality of destination cloud environments. The computer system may then migrate the plurality of online services from the source cloud environment to the plurality of destination cloud environments using the migration plan to distribute the plurality of online services amongst the plurality of destination cloud environments.

By configuring and implementing a migration plan for online services based on a measure of similarity between the online services, the computer system effectively distributes the load of the online services amongst the destination cloud environments in a balanced way, enabling the destination cloud environments to accommodate future resource consumption for online services that might grow their usage in the future. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

Figure 1:
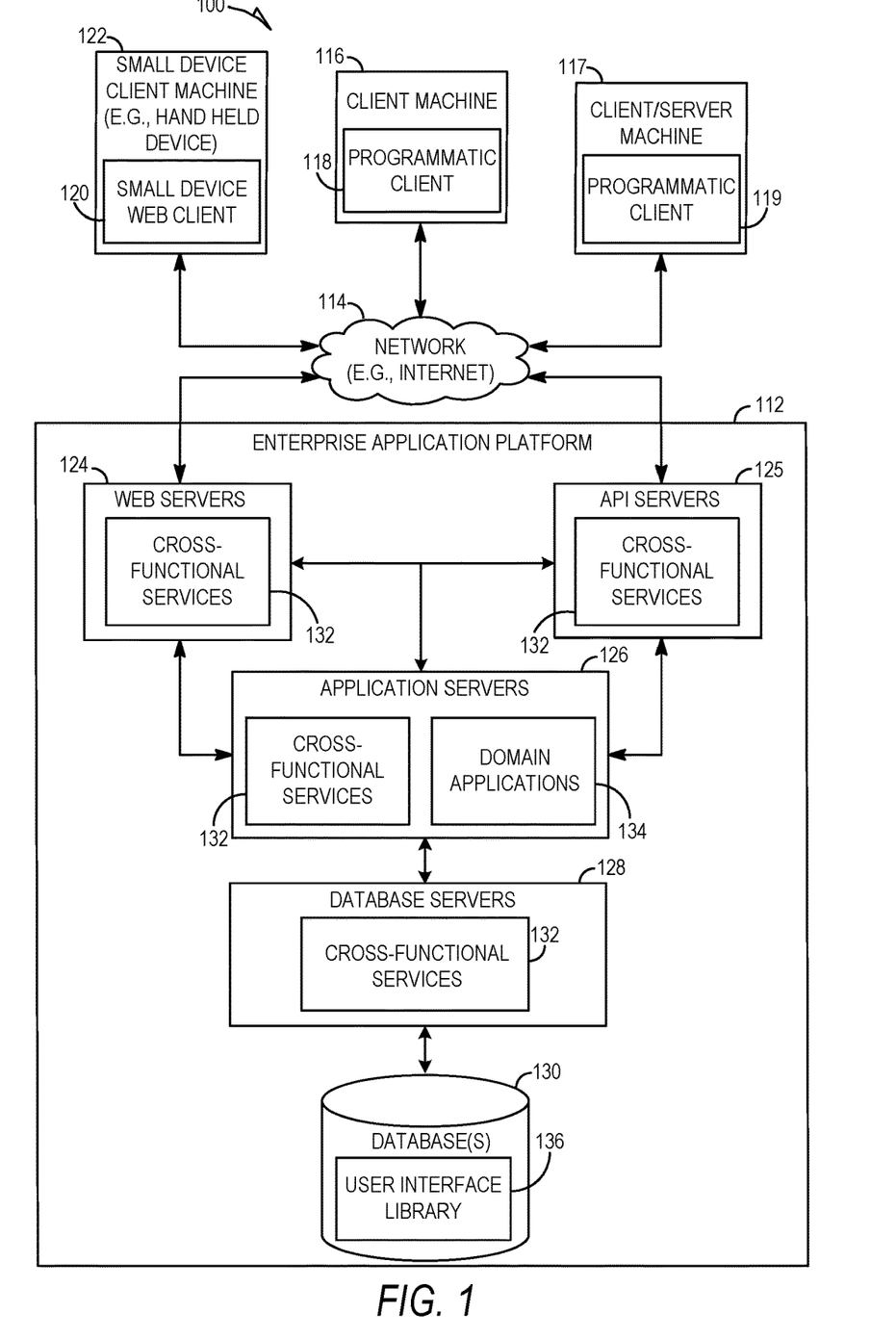
FIG. 1 is an example network diagram illustrating a system.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
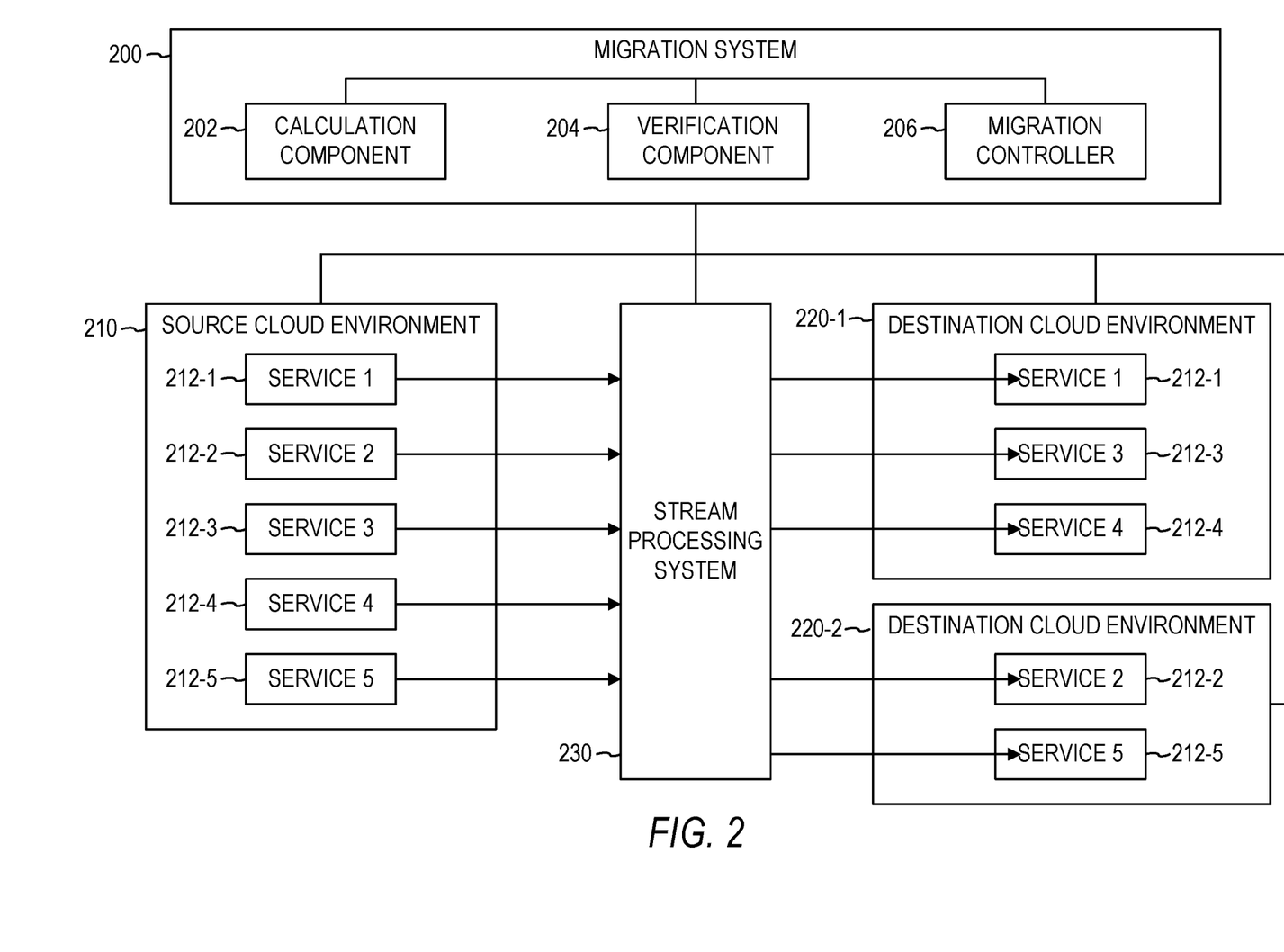
FIG. 2 is a block diagram illustrating an example migration system.

FIG. 2 is a block diagram illustrating an example migration system 200. The components shown in FIG. 2 may be configured to communicate with each other via one or more network connections. In some example embodiments, the migration system 200 comprises any combination of one or more of a calculation component 202, a verification component 204, and a migration controller 206. One or more of the components of the migration system 200 may be implemented by the enterprise application platform 112 of FIG. 1. For example, the calculation component 202, the verification component 204, and the migration controller 206 may be incorporated into the application server(s) 126. However, the migration system 200 may be implemented in other ways as well.

In some example embodiments, the migration system 200 may be connected to and communicate with a source cloud environment 210 and a plurality of destination cloud environments 220 (e.g., destination cloud environments 220-1, 220-2, . . . ), such as via a network connection. Although they may be connected via a network connection, the source cloud environment 210 and each one of the plurality of destination cloud environments 220 may be structurally separate and independent from one another. For example, the source cloud environment 210 and each one of the plurality of destination cloud environments 220 may comprise its own dedicated set one hardware resources, such as its own dedicated set of servers.

A plurality of online services 212 (e.g., online services 212-1, 212-2, 212-3, 212-4, and 212-5) may be running on the source cloud environment 210. Each online service 212 may comprise a software functionality or a set of software functionalities, such as the retrieval of specified information or the execution of a set of operations. In some example embodiments, the plurality of online services 212 may comprise a plurality of stateful services. A stateful service may comprise any service that processes requests based on the information relayed with each request and information stored from earlier requests. The plurality of online services 212 may additionally or alternatively comprise a plurality of stateless services. A stateless service may comprise any service that processes requests based only on information relayed with each request and doesn't rely on information from earlier requests. In some example embodiments, the plurality of online services 212 may comprise a plurality of database instances. However, other types of online services 212 are also within the scope of the present disclosure.

The migration system 200 and the source cloud environment 210 may be connected to a stream processing system 230. The stream processing system 230 may be configured to query or otherwise obtain continuous streams of data from the online services 212 of the source cloud environment 210 in real-time and perform operations on the received data. In some example embodiments, the stream processing system 230 may be configured to perform complex event processing, processing real-time events and extracting information from event streams as they arrive. The stream processing system 230 may capture transaction log data from the online services 212 of the source cloud environment 210. The transaction log data may comprise a history of actions executed by the corresponding online service 212 within the source cloud environment 210.

In some example embodiments, the calculation component 202 may, for each online service 212 in the source cloud environment 210, compute a corresponding edit distance value based on the stream of transaction log data of the online service 212. The edit distance value may comprise a minimum number of edit operations required to change a first log entry in the stream of first transaction log data to a second log entry in the stream of first transaction log data. For example, the edit distance value may comprise a Levenshtein distance between the first log entry and the second log entry. However, other types of edit distance values are also within the scope of the present disclosure. In some example embodiments, the edit distance values may be calculated for all handled events in the transaction log data over a particular timeframe that is made up of smaller sub-timeframes. The calculation component 202 may compute the edit distance values for events that occurred in sub-timeframes, and then the compute the average of those edit distance values for the particular timeframe to be used in the determination of the migration plan discussed below.

In some example embodiments, the migration controller 206 may be configured to determine a migration plan based on a measure of similarity between the edit distance values of the plurality of online services 212. The migration plan may specify a distribution of the plurality of online services 212 amongst a plurality of destination cloud environments 212. For example, the migration plan may specify that a portion of the plurality of online service 212 (e.g., online services 212-1, 212-3, and 212-4) be migrated from the source cloud environment 210 to the first destination cloud environment 220-1, and that a remaining portion of the plurality of online services 212 (e.g., online services 212-2 and 212-5) be migrated from the source cloud environment 210 to the second destination cloud environment 220-2. Other configurations of the migration plan are also within the scope of the present disclosure.

The migration controller 206 may determine the migration plan by determining that the measure of similarity between the edit distance value of a first online service 212-1 of the plurality of online services 212 and the edit distance value of a second online service 212-2 of the plurality of online services 212 is within a similarity threshold value (e.g., the different between the edit distance values is less than 5), and determining to migrate the first online service 212-1 to a first destination cloud environment 220-1 and to migrate the second online service 212-2 to a second cloud environment 220-2 different from the first destination cloud environment 220-1 based on the determination that the measure of similarity between the edit distance values of the first online service 212-1 and the second online service 212-2 is within a similarity threshold value.

Additionally or alternatively, the migration controller 206 may determine the migration plan by determining that the first online service 212-1 of the plurality of online services 212 and the second online service 212-2 of the plurality of online services 212 belong to a similarity group based on a comparison of the measure of similarity between the edit distance values of the first online service 212-1 and the second online service 212-2 with the measures of similarities between the edit distance values of each other pairing of online services 212 in the plurality of online services 212. The migration controller 206 may then migrate the first online service 212-1 to the first destination cloud environment 220-1 and to migrate the second online service 212-2 to the second cloud environment 220-2 different from the first destination cloud environment 220-1 based on the determination that the first online service 212-1 and the second online service 212-2 belong to the same similarity group. The migration controller 206 may cluster the plurality of online services 212 into a predetermined number of similarity groups based on their edit distance values. In one example, the migration controller 206 may use a clustering algorithm to cluster the online services 212-1, 212-2, 212-3, 212-4, and 212-5 into two different groups based on their edit distance values. Other ways of determining the migration plan are also within the scope of the present disclosure.

In some example embodiments, the migration controller 206 may be configured to migrate the plurality of online services 212 from the source cloud environment 210 to the plurality of destination cloud environments 220 using the migration plan to distribute the plurality of online services 212 amongst the plurality of destination cloud environments 220. For example, if the migration plan specifies that the online services 212-1, 212-3, and 212-4 should be migrated from the source cloud environment 210 to the first destination cloud environment 220-1 and that the online services 212-2 and 212-5 should be migrated from the source cloud environment 210 to the second destination cloud environment 220-2, then the migration controller 206 may trigger the migration of the online services 212-1, 212-3, and 212-4 from the source cloud environment 210 to the first destination cloud environment 220-1 and the online services 212-2 and 212-5 from the source cloud environment 210 to the second destination cloud environment 220-2. The triggered migration may be implemented using the stream processing system 230 to replicate the online services 212 on the destination cloud environments 220 according to the migration plan. However, the triggered migration may be implemented according to the migration plan using additional or alternative components as well.

The migration system 200 may be configured to verify that migration of the online service 212 has been successfully completed before removing the online service 212. In some example embodiments, for each online service 212 for which the migration component has triggered migration, the verification component 204 may be configured to determine a first consistency value based on a first checksum derived from the stream of transaction log data of the online service 212. The verification component 204 may determine the first consistency value by computing the first consistency value itself or by obtaining the first consistency value from another computer component that has computed the first consistency value, such as from the stream processing system 230. In some example embodiments, the first consistency value may be computed based on a hash function, such as a cryptographic checksum. However, the first consistency value may be computed in other ways as well.

The verification component 204 may also determine a second consistency value of the online service 212. The second consistency value may be based on a second checksum derived from transaction log data comprising a set of actions executed by the online service within the destination cloud environment 220 to which it was migrated. The verification component 204 may determine the second consistency value by computing the second consistency value itself or by obtaining the second consistency value from another computer component that has computed the second consistency value, such as from the destination cloud environment 220 to which the online service 212 was migrated. In some example embodiments, the second consistency value may be computed based on a hash function, such as the same hash function discussed above with respect to the computing of the first consistency value. However, the second consistency value may be computed in other ways as well.

In some example embodiments, the verification component 204 may determine that a difference between the first consistency value and the second consistency value is within a consistency threshold value. The consistency threshold value may be configured such that the first consistency value and the second consistency value match. However, other configurations of the consistency threshold value are also within the scope of the present disclosure. The migration controller 206 may be configured to initiate a deletion of the online service from the source cloud environment 210 based on the determination that the difference between the first consistency value and the second consistency value is within the consistency threshold value. For example, the migration controller 206 may transmit one or more instructions to the source cloud environment 210 instructing and causing the source cloud environment 210 to remove the first online service 212-1 from the source cloud environment 210, such as by removing the first online service 212-1 from a server of the source cloud environment 210 on which the first online service 212-1 resides, based on a determination that a first consistency value and a second consistency value of the first online service 212-1 match each other or are otherwise within a specified consistency threshold value.

The functions of the migration system 200 discussed in the present disclosure may be trigger by a human user. However, in some example embodiments, the functions of the migration system 200 discussed in the present disclosure may be automatically triggered in order to ensure that the online services 212 are migrated from the source cloud environment 210 to the destination cloud environments 220 before overloading occurs.

Figure 3:
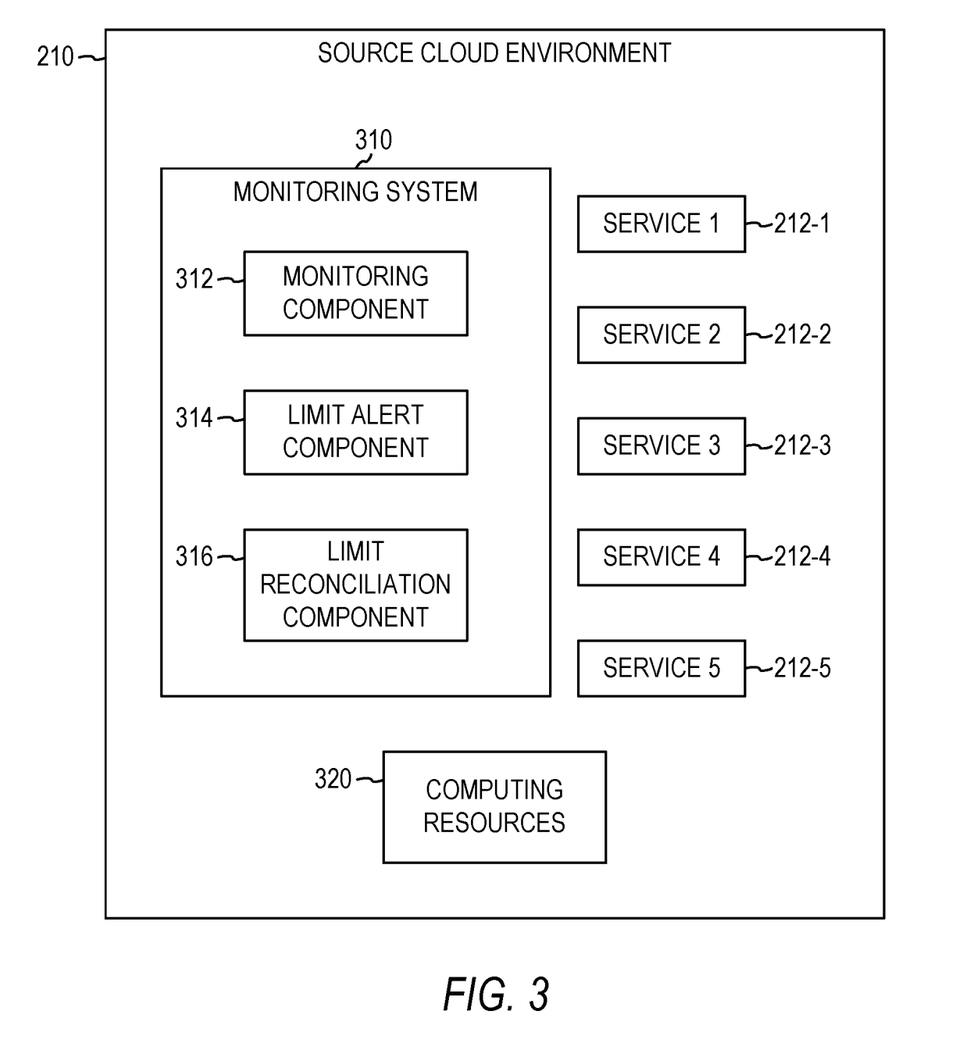
FIG. 3 illustrates an example monitoring system.

FIG. 3 illustrates an example monitoring system 310. The monitoring system 310 may be configured to automatically retrieve limits for computing resources 320 of the source cloud environment 310, and to create and enforce alerting rules based on the limits in order to notify human users or automatically trigger migration before functional limits of the source cloud environment 310 are met or exceeded. The computing resources 320 may comprise one or more hardware resources, one or more software resources, one or more networking resources, one or more data storage resources, one or more memory resources, or one or more virtual resources. Other types of computing resources 320 are also within the scope of the present disclosure.

In some example embodiments, the monitoring system 310 is implemented within the source could environment 210. The monitoring system 310 may comprise any combination of one or more of a monitoring component 312, a limit alert component 314, and a limit reconciliation component 316. One or more of the components of the monitoring system 310 may be implemented by the enterprise application platform 112 of FIG. 1. For example, the monitoring component 312, the limit alert component 314, and the limit reconciliation component 316 may be incorporated into the application server(s) 126. However, the monitoring system 310 may be implemented in other ways as well. The components shown in FIG. 3 may be configured to communicate with each other via one or more network connections.

The limit reconciliation component 316 may be configured to reconcile changes in limits for the computing resources 320 and represent them as custom resources within the source cloud environment 210. The limit reconciliation component 316 may store which cloud provider the compute resources 320 in the source cloud environment 210 are provisioned, and may use that information to determine which API's or other data sources to query in order to obtain the limits for the computing resources 320.

In some example embodiments, the limit alert component 314 may be configured to obtain one or more limits for one or more computing resources 320 of the source cloud environment 210. For example, the limit alert component 314 may obtain the limits from the limit reconciliation component 316. However, the limit alert component 314 may obtain the limits from other sources and in other ways as well. The limit alert component 314 may be configured to determine one or more alerting rules for one or more computing resources 320 of the source cloud environment 210 based on the one or more limits. The one or more alerting rules may indicate a threshold level of usage of the one or more computing resources 320 below the one or more limits.

The monitoring component 312 may be configured to obtain one or more metrics of usage of the one or more computing resources 320 of the source cloud environment 210. The one or more metrics may comprise a central processing unit (CPU) utilization metric, a disk usage metric, a memory utilization metric, a metric of received requests, a latency metric, an error rate metric, a load capacity metric, a jitter metric, a packet loss metric, or a throughput metric. Other types of metrics of usage are also within the scope of the present disclosure.

In some example embodiments, the monitoring component 312 may be configured to determine that the one or more metrics of usage of the one or more computing resources 320 of the source cloud environment 210 exceed the threshold level of usage of the one or more computing resources 320. The monitoring component 312 may be configured to alert a user that the one or more metrics of usage of the one or more computing resources 320 of the source cloud environment 210 exceed the threshold level of usage of the one or more computing resources 320 in response to or otherwise based on this determination. For example, the monitoring component may display a notification of the determination on a computing device of the user.

Additionally or alternatively, the monitoring component 312 may be configured to, in response to or otherwise based on the determination, may initiate a migration process to migrate the plurality of services from the source cloud environment 210 to the plurality of destination cloud environments 220. For example, in response to the determination that the one or more metrics of usage of the one or more computing resources 320 of the source cloud environment 210 exceed the threshold level of usage of the one or more computing resources 320, the monitoring component 312 may communicate one or more instructions to the migration system 200 to trigger performance of one or more of the functions of the calculation component 202 or the migration controller 206 discussed above.

Figure 4:
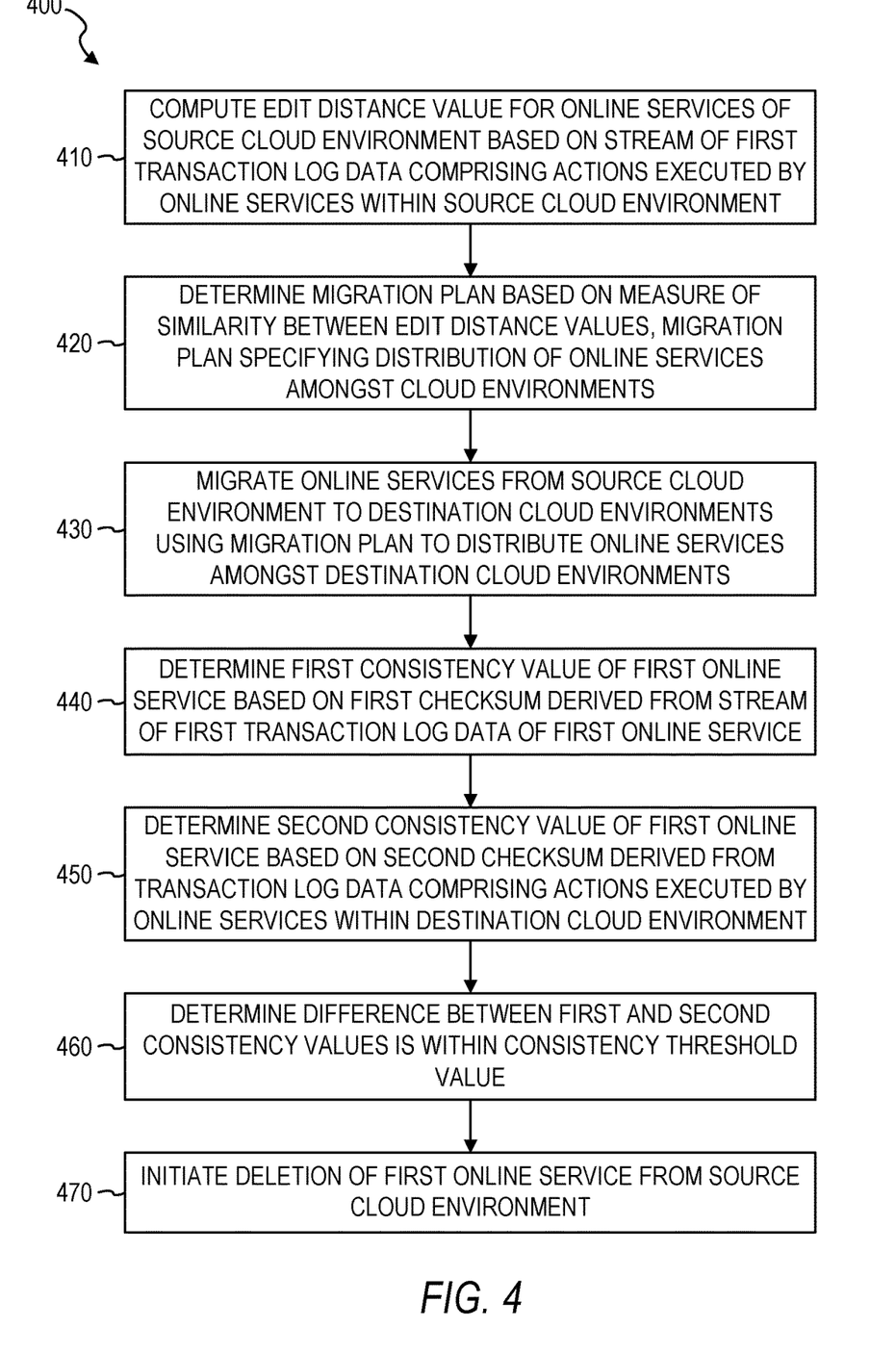
FIG. 4 is a flowchart illustrating an example method of dynamically migrating services based on similarity.

FIG. 4 is a flowchart illustrating an example method 400 of dynamically migrating services based on similarity. The method 400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 400 are performed by the migration system 200 of FIG. 2 or any combination of one or more of its components (e.g., the calculation component 202, the verification component 204, the migration controller 206).

At operation 410, the migration system 200 may, for each online service 212 in a plurality of online services 212 of a source cloud environment 210, compute a corresponding edit distance value based on a stream of first transaction log data of the online service 212. The stream of first transaction log data may comprise a first set of actions executed by the online service 212 within the source cloud environment 210. The edit distance value may comprise a minimum number of edit operations required to change a first log entry in the stream of first transaction log data to a second log entry in the stream of first transaction log data. For example, the edit distance value may comprise a Levenshtein distance between the first log entry and the second log entry. However, other types of edit distance values are also within the scope of the present disclosure. The plurality of online services 212 may comprise a plurality of stateful services. However, the plurality of online services 212 may additionally or alternatively comprise a plurality of stateless services. In some example embodiments, the plurality of online services 212 may comprise a plurality of database instances. However, other types of online services 212 are also within the scope of the present disclosure.

The migration system 200 may then determine a migration plan based on a measure of similarity between the edit distance values of the plurality of online services 212, at operation 420. The migration plan may specify a distribution of the plurality of online services 212 amongst a plurality of destination cloud environments 212. For example, the migration plan may specify that a portion of the plurality of online service 212 (e.g., online services 212-1, 212-3, and 212-4) be migrated from the source cloud environment 210 to the first destination cloud environment 220-1, and that a remaining portion of the plurality of online services 212 (e.g., online services 212-2 and 212-5) be migrated from the source cloud environment 210 to the second destination cloud environment 220-2. Other configurations of the migration plan are also within the scope of the present disclosure.

In some example embodiments, the migration system 200 may determine the migration plan by determining that the measure of similarity between the edit distance value of a first online service 212-1 of the plurality of online services 212 and the edit distance value of a second online service 212-2 of the plurality of online services 212 is within a similarity threshold value, and determining to migrate the first online service 212-1 to a first destination cloud environment 220-1 and to migrate the second online service 212-2 to a second cloud environment 220-2 different from the first destination cloud environment 220-1 based on the determination that the measure of similarity between the edit distance values of the first online service 212-1 and the second online service 212-2 is within a similarity threshold value. Additionally or alternatively, the migration system 200 may determine the migration plan by determining that the first online service 212-1 of the plurality of online services 212 and the second online service 212-2 of the plurality of online services 212 belong to a similarity group based on a comparison of the measure of similarity between the edit distance values of the first online service 212-1 and the second online service 212-2 with the measures of similarities between the edit distance values of each other pairing of online services 212 in the plurality of online services 212, and determining to migrate the first online service 212-1 to the first destination cloud environment 220-1 and to migrate the second online service 212-2 to the second cloud environment 220-2 different from the first destination cloud environment 220-1 based on the determination that the first online service 212-1 and the second online service 212-2 belong to the same similarity group. Other ways of determining the migration plan are also within the scope of the present disclosure.

Next, the migration system 200 may, at operation 430, migrate the plurality of online services 212 from the source cloud environment 210 to the plurality of destination cloud environments 220 using the migration plan to distribute the plurality of online services 212 amongst the plurality of destination cloud environments 220. For example, if the migration plan specifies that the online services 212-1, 212-3, and 212-4 should be migrated from the source cloud environment 210 to the first destination cloud environment 220-1 and that the online services 212-2 and 212-5 should be migrated from the source cloud environment 210 to the second destination cloud environment 220-2, then the migration system 200 trigger the migration of the online services 212-1, 212-3, and 212-4 from the source cloud environment 210 to the first destination cloud environment 220-1 and the online services 212-2 and 212-5 from the source cloud environment 210 to the second destination cloud environment 220-2. The triggered migration may be implemented using the stream processing system 230 to replicate the online services 212 on the destination cloud environments 220 according to the migration plan. However, the triggered migration may be implemented according to the migration plan using additional or alternative components as well.

At operation 440, the migration system 200 may determine a first consistency value of a first online service 212-1 of the plurality of online services 212. The first consistency value may be based on a first checksum derived from the stream of first transaction log data of the first online service 212-1. The migration system 200 may determine the first consistency value by computing the first consistency value itself or by obtaining the first consistency value from another computer component that has computed the first consistency value, such as from the stream processing system 230. In some example embodiments, the first consistency value may be computed based on a hash function, such as a cryptographic checksum. However, the first consistency value may be computed in other ways as well.

The migration system 200 may also, at operation 450, determine a second consistency value of the first online service 212-1. The second consistency value may be based on a second checksum derived from transaction log data comprising a second set of actions executed by the first online service 212-1 within the destination cloud environment 220 to which it was migrated. The migration system 200 may determine the second consistency value by computing the second consistency value itself or by obtaining the second consistency value from another computer component that has computed the second consistency value, such as from the destination cloud environment 220 to which the first online service 212-1 was migrated. In some example embodiments, the second consistency value may be computed based on a hash function, such as the same hash function discussed above with respect to the computing of the first consistency value. However, the second consistency value may be computed in other ways as well.

Next, the migration system 200 may determine that a difference between the first consistency value and the second consistency value is within a consistency threshold value, at operation 460. In some example embodiments, consistency threshold value is such that the first consistency value and the second consistency value match. However, other configurations of the consistency threshold value are also within the scope of the present disclosure.

The migration system 200 may then, at operation 470, initiate a deletion of the first online service 212-1 from the source cloud environment 210 based on the determining that the difference between the first consistency value and the second consistency value is within the consistency threshold value. For example, the migration system 200 may transmit one or more instructions to the source cloud environment 210 instructing and causing the source cloud environment 210 to remove the first online service 212-1 from the source cloud environment 210, such as by removing the first online service 212-1 from a server of the source cloud environment 210 on which the first online service 212-1 resides.

It is contemplated that any of the other features described within the present disclosure can be incorporated into the method 400.

Figure 5:
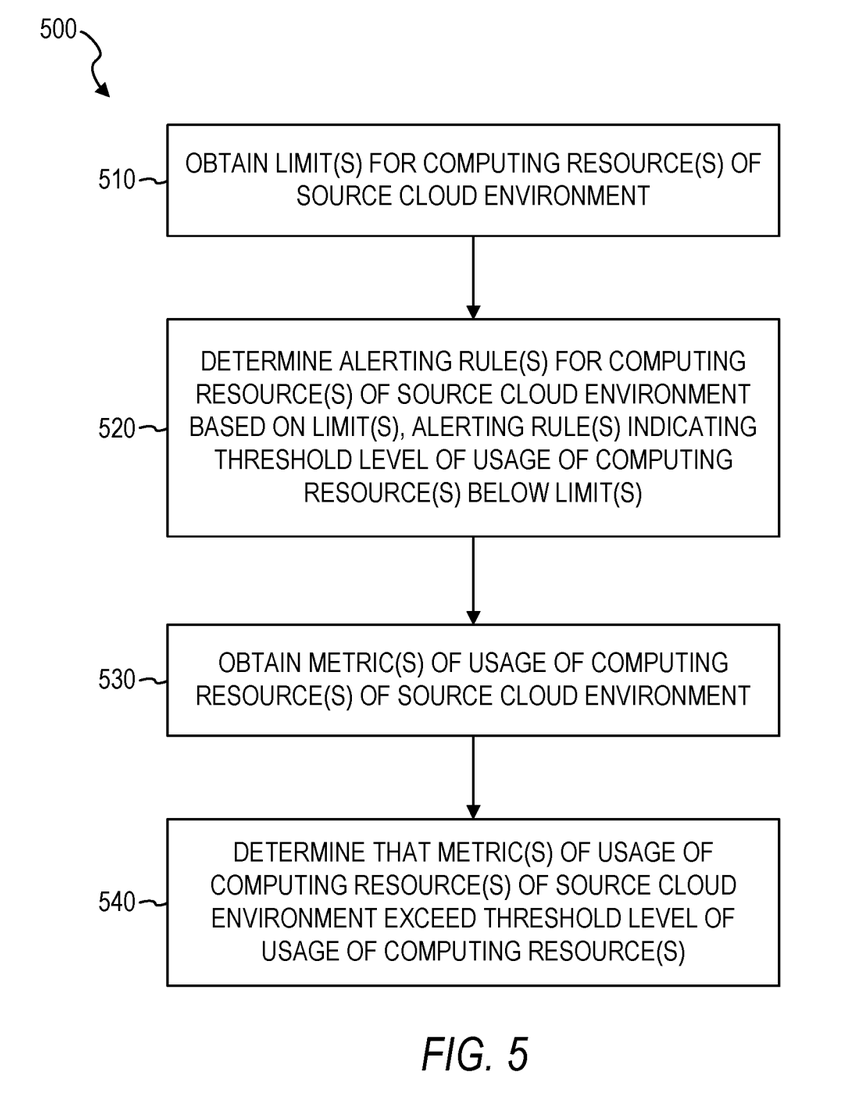
FIG. 5 is a flowchart illustrating an example method of determining when to migrate services.

FIG. 5 is a flowchart illustrating an example method 500 of determining when to migrate services. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by the monitoring system 310 of FIG. 3 or any combination of one or more of its components (e.g., the monitoring component 312, the limit alert component 314, the limit reconciliation component 316). The method 500 may include operations 510, 520, 530, and 540 being performed prior to one or more of operations 410, 420, or 430 of the method 400.

At operation 510, the monitoring system 310 may obtain one or more limits for one or more computing resources 320 of the source cloud environment 210. The one or more computing resources 320 may comprise one or more hardware resources, one or more software resources, one or more networking resources, one or more data storage resources, one or more memory resources, or one or more virtual resources. Other types of computing resources 320 are also within the scope of the present disclosure.

Next, the monitoring system 310 may determine one or more alerting rules for the one or more computing resources 320 of the source cloud environment 210 based on the one or more limits, at operation 520. The one or more alerting rules may indicate a threshold level of usage of the one or more computing resources 320 below the one or more limits.

The monitoring system 310 may then, at operation 530, obtain one or more metrics of usage of the one or more computing resources 320 of the source cloud environment 210. The one or more metrics may comprise a central processing unit (CPU) utilization metric, a disk usage metric, a memory utilization metric, a metric of received requests, a latency metric, an error rate metric, a load capacity metric, a jitter metric, a packet loss metric, or a throughput metric. Other types of metrics of usage are also within the scope of the present disclosure.

At operation 540, the monitoring system 310 may determine that the one or more metrics of usage of the one or more computing resources 320 of the source cloud environment 210 exceed the threshold level of usage of the one or more computing resources 320. In some example embodiments, the monitoring system 310 may alert a user that the one or more metrics of usage of the one or more computing resources 320 of the source cloud environment 210 exceed the threshold level of usage of the one or more computing resources 320 in response to or otherwise based on the determination at operation 540, such as by causing a notification of the determination to be displayed on a computing device of the user. Additionally or alternatively, the monitoring system 310, in response to or otherwise based on the determination at operation 540, may initiate a migration process to migrate the plurality of services from the source cloud environment 210 to the plurality of destination cloud environments 220, such as by proceeding to operation 410, 420, or 430 of the method 400.

It is contemplated that any of the other features described within the present disclosure can be incorporated into the method 500.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: for each online service in a plurality of online services of a source cloud environment, computing a corresponding edit distance value based on a stream of first transaction log data of the online service, the stream of first transaction log data comprising a first set of actions executed by the online service within the source cloud environment, the edit distance value comprising a minimum number of edit operations required to change a first log entry in the stream of first transaction log data to a second log entry in the stream of first transaction log data; determining a migration plan based on a measure of similarity between the edit distance values of the plurality of online services, the migration plan specifying a distribution of the plurality of online services amongst a plurality of destination cloud environments; and migrating the plurality of online services from the source cloud environment to the plurality of destination cloud environments using the migration plan to distribute the plurality of online services amongst the plurality of destination cloud environments.

Example 2 includes the computer-implemented method of example 1, wherein the plurality of online services comprises a plurality of stateful services.

Example 3 includes the computer-implemented method of example 1 or example 2, wherein the plurality of online services comprises a plurality of database instances.

Example 4 includes the computer-implemented method of any one of examples 1 to 3, wherein the determining the migration plan comprises: determining that the measure of similarity between the edit distance value of a first online service of the plurality of online services and the edit distance value of a second online service of the plurality of online services is within a similarity threshold value; and determining to migrate the first online service to a first destination cloud environment and to migrate the second online service to a second cloud environment different from the first destination cloud environment based on the determining that the measure of similarity between the edit distance values of the first online service and the second online service is within a similarity threshold value.

Example 5 includes the computer-implemented method of any one of examples 1 to 4, wherein the determining the migration plan comprises: determining that a first online service of the plurality of online services and a second online service of the plurality of online services belong to a similarity group based on a comparison of the measure of similarity between the edit distance values of the first online service and the second online service with the measures of similarities between the edit distance values of each other pairing of online services in the plurality of online services; and determining to migrate the first online service to a first destination cloud environment and to migrate the second online service to a second cloud environment different from the first destination cloud environment based on the determining that the first online service and the second online service belong to the similarity group.

Example 6 includes the computer-implemented method of any one of examples 1 to 5, further comprising: determining a first consistency value of a first online service of the plurality of online services, the first consistency value being based on a first checksum derived from the stream of first transaction log data of the first online service; determining a second consistency value of the first online service, the second consistency value being based on a second checksum derived from transaction log data comprising a second set of actions executed by the first online service within one of the plurality of the destination cloud environments to which it was migrated using the migration plan; determining that a difference between the first consistency value and the second consistency value is within a consistency threshold value; and initiating a deletion of the first online service from the source cloud environment based on the determining that the difference between the first consistency value and the second consistency value is within the consistency threshold value.

Example 7 includes the computer-implemented method of any one of examples 1 to 6, further comprising: obtaining one or more limits for one or more computing resources of the source cloud environment; determining one or more alerting rules for the one or more computing resources of the source cloud environment based on the one or more limits, the one or more alerting rules indicating a threshold level of usage of the one or more computing resources below the one or more limits; obtaining one or more metrics of usage of the one or more computing resources of the source cloud environment; and determining that the one or more metrics of usage of the one or more computing resources of the source cloud environment exceed the threshold level of usage of the one or more computing resources, wherein the migrating the plurality of online services from the source cloud environment to the plurality of destination cloud environments using the migration plan is performed based on the determining that the one or more metrics of usage exceed the threshold level of usage.

Example 8 includes the computer-implemented method of any one of examples 1 to 7, wherein the one or more computing resources comprises one or more hardware resources, one or more software resources, one or more networking resources, one or more data storage resources, one or more memory resources, or one or more virtual resources.

Example 9 includes the computer-implemented method of any one of examples 1 to 8, wherein the one or more metrics comprises a central processing unit (CPU) utilization metric, a disk usage metric, a memory utilization metric, a metric of received requests, a latency metric, an error rate metric, a load capacity metric, a jitter metric, a packet loss metric, or a throughput metric.

Example 10 includes a system comprising: at least one processor; and a non-transitory computer-readable medium storing executable instructions that, when executed, cause the at least one processor to perform the method of any one of examples 1 to 9.

Example 11 includes a non-transitory machine-readable storage medium, tangibly embodying a set of instructions that, when executed by at least one processor, causes the at least one processor to perform the method of any one of examples 1 to 9.

Example 12 includes a machine-readable medium carrying a set of instructions that, when executed by at least one processor, causes the at least one processor to carry out the method of any one of examples 1 to 9.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 6:
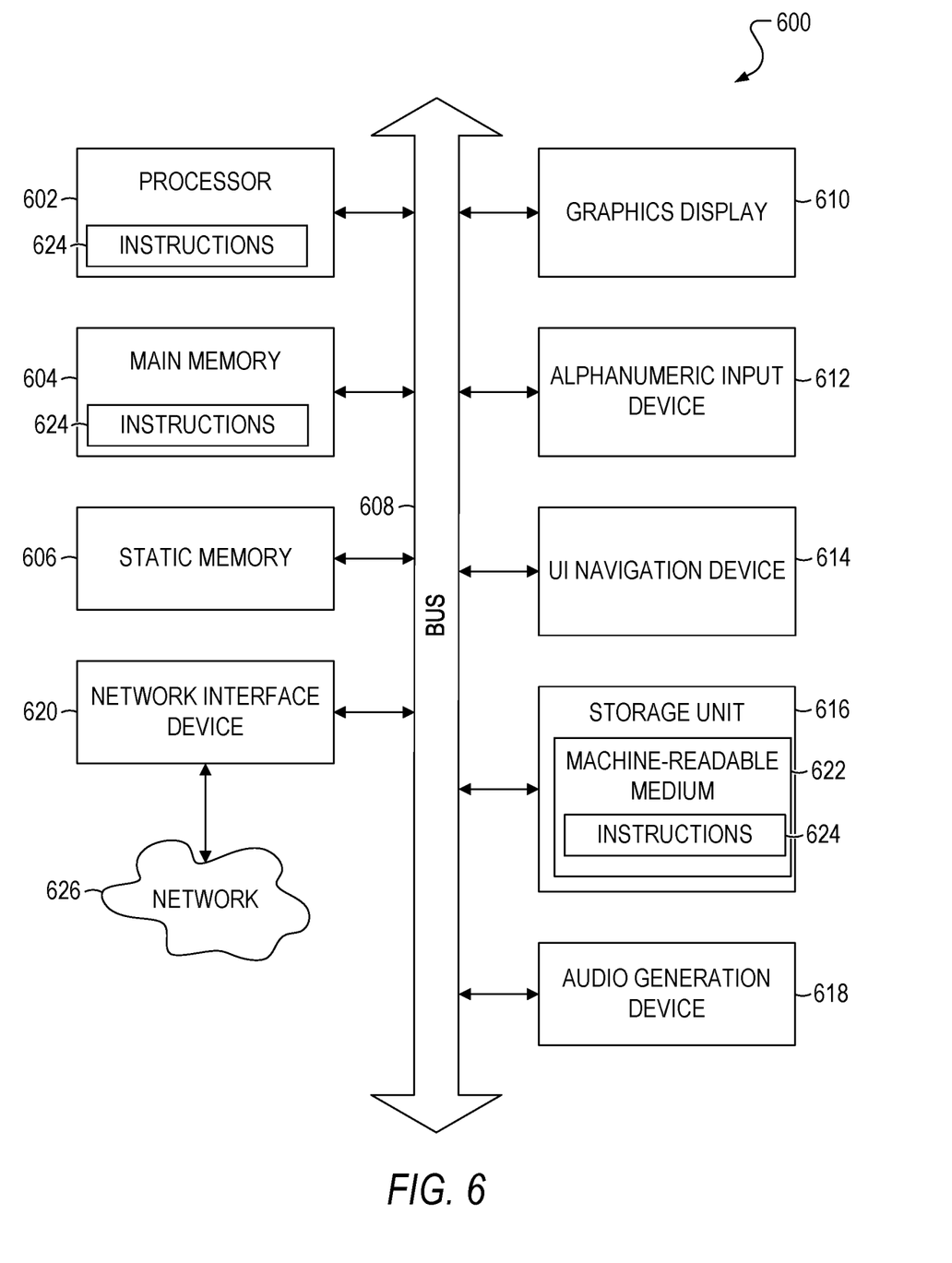
FIG. 6 is a block diagram of an example computer system on which methodologies described herein can be executed.

FIG. 6 is a block diagram of a machine in the example form of a computer system 600 within which instructions 624 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604, and a static memory 606, which communicate with each other via a bus 608. The computer system 600 may further include a graphics or video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a storage unit (e.g., a disk drive unit) 616, an audio or signal generation device 618 (e.g., a speaker), and a network interface device 620.

The storage unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system comprising a memory and at least one hardware processor, the computer-implemented method comprising:
    for each online service in a plurality of online services of a source cloud environment, computing a corresponding edit distance value based on a stream of first transaction log data of the online service, the stream of first transaction log data comprising a first set of actions executed by the online service within the source cloud environment, the edit distance value comprising a minimum number of edit operations required to change a first log entry in the stream of first transaction log data to a second log entry in the stream of first transaction log data;
    determining a migration plan based on a measure of similarity between the edit distance values of the plurality of online services, the migration plan specifying a distribution of the plurality of online services amongst a plurality of destination cloud environments; and
    migrating the plurality of online services from the source cloud environment to the plurality of destination cloud environments using the migration plan to distribute the plurality of online services amongst the plurality of destination cloud environments.

2. The computer-implemented method of claim 1, wherein the plurality of online services comprises a plurality of stateful services.

3. The computer-implemented method of claim 1, wherein the plurality of online services comprises a plurality of database instances.

4. The computer-implemented method of claim 1, wherein the determining the migration plan comprises:
    determining that the measure of similarity between the edit distance value of a first online service of the plurality of online services and the edit distance value of a second online service of the plurality of online services is within a similarity threshold value; and
    determining to migrate the first online service to a first destination cloud environment and to migrate the second online service to a second cloud environment different from the first destination cloud environment based on the determining that the measure of similarity between the edit distance values of the first online service and the second online service is within a similarity threshold value.

5. The computer-implemented method of claim 1, wherein the determining the migration plan comprises:
   determining that a first online service of the plurality of online services and a second online service of the plurality of online services belong to a similarity group based on a comparison of the measure of similarity between the edit distance values of the first online service and the second online service with the measures of similarities between the edit distance values of each other pairing of online services in the plurality of online services; and
   determining to migrate the first online service to a first destination cloud environment and to migrate the second online service to a second cloud environment different from the first destination cloud environment based on the determining that the first online service and the second online service belong to the similarity group.

6. The computer-implemented method of claim 1, further comprising:
   determining a first consistency value of a first online service of the plurality of online services, the first consistency value being based on a first checksum derived from the stream of first transaction log data of the first online service;
   determining a second consistency value of the first online service, the second consistency value being based on a second checksum derived from transaction log data comprising a second set of actions executed by the first online service within one of the plurality of the destination cloud environments to which it was migrated using the migration plan;
   determining that a difference between the first consistency value and the second consistency value is within a consistency threshold value; and
   initiating a deletion of the first online service from the source cloud environment based on the determining that the difference between the first consistency value and the second consistency value is within the consistency threshold value.

7. The computer-implemented method of claim 1, further comprising:
   obtaining one or more limits for one or more computing resources of the source cloud environment;
   determining one or more alerting rules for the one or more computing resources of the source cloud environment based on the one or more limits, the one or more alerting rules indicating a threshold level of usage of the one or more computing resources below the one or more limits;
   obtaining one or more metrics of usage of the one or more computing resources of the source cloud environment; and
   determining that the one or more metrics of usage of the one or more computing resources of the source cloud environment exceed the threshold level of usage of the one or more computing resources, wherein the migrating the plurality of online services from the source cloud environment to the plurality of destination cloud environments using the migration plan is performed based on the determining that the one or more metrics of usage exceed the threshold level of usage.

8. The computer-implemented method of claim 7, wherein the one or more computing resources comprises one or more hardware resources, one or more software resources, one or more networking resources, one or more data storage resources, one or more memory resources, or one or more virtual resources.

9. The computer-implemented method of claim 7, wherein the one or more metrics comprises a central processing unit (CPU) utilization metric, a disk usage metric, a memory utilization metric, a metric of received requests, a latency metric, an error rate metric, a load capacity metric, a jitter metric, a packet loss metric, or a throughput metric.

10. A system of comprising:
    at least one hardware processor; and
    a non-transitory computer-readable medium storing executable instructions that, when executed, cause at least one hardware processor to perform computer operations comprising:
    for each online service in a plurality of online services of a source cloud environment, computing a corresponding edit distance value based on a stream of first transaction log data of the online service, the stream of first transaction log data comprising a first set of actions executed by the online service within the source cloud environment, the edit distance value comprising a minimum number of edit operations required to change a first log entry in the stream of first transaction log data to a second log entry in the stream of first transaction log data;
    determining a migration plan based on a measure of similarity between the edit distance values of the plurality of online services, the migration plan specifying a distribution of the plurality of online services amongst a plurality of destination cloud environments; and
    migrating the plurality of online services from the source cloud environment to the plurality of destination cloud environments using the migration plan to distribute the plurality of online services amongst the plurality of destination cloud environments.

11. The system of claim 10, wherein the plurality of online services comprises a plurality of stateful services.

12. The system of claim 10, wherein the plurality of online services comprises a plurality of database instances.

13. The system of claim 10, wherein the determining the migration plan comprises:
    determining that the measure of similarity between the edit distance value of a first online service of the plurality of online services and the edit distance value of a second online service of the plurality of online services is within a similarity threshold value; and
    determining to migrate the first online service to a first destination cloud environment and to migrate the second online service to a second cloud environment different from the first destination cloud environment based on the determining that the measure of similarity between the edit distance values of the first online service and the second online service is within a similarity threshold value.

14. The system of claim 10, wherein the determining the migration plan comprises:
    determining that a first online service of the plurality of online services and a second online service of the plurality of online services belong to a similarity group based on a comparison of the measure of similarity between the edit distance values of the first online service and the second online service with the measures of similarities between the edit distance values of each other pairing of online services in the plurality of online services; and determining to migrate the first online service to a first destination cloud environment and to migrate the second online service to a second cloud environment different from the first destination cloud environment based on the determining that the first online service and the second online service belong to the similarity group.

15. The system of claim 10, wherein the computer operations further comprise:

determining a first consistency value of a first online service of the plurality of online services, the first consistency value being based on a first checksum derived from the stream of first transaction log data of the first online service;

determining a second consistency value of the first online service, the second consistency value being based on a second checksum derived from transaction log data comprising a second set of actions executed by the first online service within one of the plurality of the destination cloud environments to which it was migrated using the migration plan;

determining that a difference between the first consistency value and the second consistency value is within a consistency threshold value; and initiating a deletion of the first online service from the source cloud environment based on the determining that the difference between the first consistency value and the second consistency value is within the consistency threshold value.

16. The system of claim 10, wherein the computer operations further comprise:

obtaining one or more limits for one or more computing resources of the source cloud environment;

determining one or more alerting rules for the one or more computing resources of the source cloud environment based on the one or more limits, the one or more alerting rules indicating a threshold level of usage of the one or more computing resources below the one or more limits;

obtaining one or more metrics of usage of the one or more computing resources of the source cloud environment; and determining that the one or more metrics of usage of the one or more computing resources of the source cloud environment exceed the threshold level of usage of the one or more computing resources, wherein the migrating the plurality of online services from the source cloud environment to the plurality of destination cloud environments using the migration plan is performed based on the determining that the one or more metrics of usage exceed the threshold level of usage.

17. The system of claim 16, wherein the one or more computing resources comprises one or more hardware resources, one or more software resources, one or more networking resources, one or more data storage resources, one or more memory resources, or one or more virtual resources.

18. The system of claim 16, wherein the one or more metrics comprises a central processing unit (CPU) utilization metric, a disk usage metric, a memory utilization metric, a metric of received requests, a latency metric, an error rate metric, a load capacity metric, a jitter metric, a packet loss metric, or a throughput metric.

19. A non-transitory machine-readable storage medium tangibly embodying a set of instructions that, when executed by at least one hardware processor, causes the at least one hardware processor to perform computer operations comprising:

for each online service in a plurality of online services of a source cloud environment, computing a corresponding edit distance value based on a stream of first transaction log data of the online service, the stream of first transaction log data comprising a first set of actions executed by the online service within the source cloud environment, the edit distance value comprising a minimum number of edit operations required to change a first log entry in the stream of first transaction log data to a second log entry in the stream of first transaction log data;

determining a migration plan based on a measure of similarity between the edit distance values of the plurality of online services, the migration plan specifying a distribution of the plurality of online services amongst a plurality of destination cloud environments; and migrating the plurality of online services from the source cloud environment to the plurality of destination cloud environments using the migration plan to distribute the plurality of online services amongst the plurality of destination cloud environments.

20. The non-transitory machine-readable storage medium of claim 19, wherein the plurality of online services comprises a plurality of stateful services.

* * * * *